US012348829B2

(12) United States Patent
Kim et al.

(10) Patent No.: US 12,348,829 B2
(45) Date of Patent: Jul. 1, 2025

(54) ELECTRONIC DEVICE AND OPERATING METHOD THEREOF

(71) Applicant: LG ELECTRONICS INC., Seoul (KR)

(72) Inventors: Sang Hun Kim, Seoul (KR); Hyo Jeong Jeong, Seoul (KR); Tae Young Kim, Seoul (KR); Tae Jin Park, Seoul (KR); Hyung Woo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 18/337,995

(22) Filed: Jun. 20, 2023

(65) Prior Publication Data

US 2024/0334020 A1    Oct. 3, 2024

(30) Foreign Application Priority Data

Mar. 29, 2023  (KR) .......................... 10-2023-0041333

(51) Int. Cl.
*H04N 21/485*   (2011.01)

(52) U.S. Cl.
CPC ................................ *H04N 21/4852* (2013.01)

(58) Field of Classification Search
CPC .. H04N 21/4852; H04R 3/12; H04R 2420/07; H04R 5/04; H04R 3/04; H04S 7/301; G10L 21/0332; G10L 25/51
USPC ........................................................ 725/151
See application file for complete search history.

(56) References Cited

U.S. PATENT DOCUMENTS

| 9,858,943 B1* | 1/2018 | Carlsson ................. H04S 1/002 |
| 10,459,684 B2* | 10/2019 | Shih ........................ G06F 3/165 |
| 2006/0088174 A1 | 4/2006 | DeLeeuw et al. |
| 2008/0013752 A1* | 1/2008 | Stephens ................ H03G 5/005 |
| | | 381/103 |
| 2021/0034321 A1 | 2/2021 | Kim et al. |

FOREIGN PATENT DOCUMENTS

| EP | 3833047 | 6/2021 |
| JP | 2019-129388 | 8/2019 |
| KR | 10-2008-0027987 | 3/2008 |
| KR | 10-2019-0045082 | 5/2019 |

(Continued)

OTHER PUBLICATIONS

European Patent Office Application Serial No. 24154062.4, Search Report dated Jul. 19, 2024, 7 pages.

(Continued)

*Primary Examiner* — Adil Ocak
(74) *Attorney, Agent, or Firm* — LEE, HONG, DEGERMAN, KANG & WAIMEY (57) ABSTRACT

An electronic device comprises a speaker; a wireless communication interface configured to communicate with an external device, wirelessly; and a controller configured to transmit a sound source to the speaker, transmit the sound source to the external device through the wireless communication interface, obtain a first audio corresponding to the sound source output through the speaker and a second audio corresponding to the sound source output through the external device, and control an EQ (Equalizer) mode of the external device based on a comparison result between the first audio and the second audio, or output a calibrated sound source to the speaker.

15 Claims, 9 Drawing Sheets

(56) References Cited

FOREIGN PATENT DOCUMENTS

| KR | 10-2021-0009189 | 1/2021 |
|----|-----------------|--------|
| KR | 10-2021-0068953 | 6/2021 |
| KR | 10-2022-0137367 | 10/2022 |
| WO | 2014-148844 | 9/2014 |

OTHER PUBLICATIONS

Korean Intellectual Property Office Application No. 10-2023-0041333, Office Action dated Jul. 30, 2024, 6 pages.

\* cited by examiner

ELECTRONIC DEVICE AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2023-0041333, filed on Mar. 29, 2023, the contents of which are all hereby incorporated by reference herein in their entireties.

BACKGROUND

The present disclosure relates to an electronic device.

Digital television services using wired or wireless communication networks are becoming more common. Digital TV services can provide various services that cannot be provided by conventional analog broadcasting services.

For example, Internet Protocol Television (IPTV) and smart TV services, which are types of digital TV services, provide interactivity that allows users to actively choose the type of program to watch and the time to watch it. Based on this interactivity, IPTV and smart TV services can also offer a variety of additional services, such as Internet browsing, home shopping, and online gaming.

In recent years, to enhance the sound field, user listen to audio through the TV's built-in speaker and external speaker.

While the user can visually see what mode the TV's sound mode is set to, the sound mode of the external speaker is not visible to the user, so there is a problem that if the sound modes of the two speakers are different, the sound quality may feel heterogeneous.

SUMMARY

The problem to be solved of the present disclosure is to minimize disparity in audio output from speaker built into electronic device and external device.

The problem to be solved of the present disclosure is to automatically provide an acoustic setting that meets the intent of the user.

An electronic device according to an embodiment of the present disclosure may comprise a speaker; a wireless communication interface configured to communicate with an external device, wirelessly; and a controller configured to transmit a sound source to the speaker, transmit the sound source to the external device through the wireless communication interface, obtain a first audio corresponding to the sound source output through the speaker and a second audio corresponding to the sound source output through the external device, and control an EQ (Equalizer) mode of the external device based on a comparison result between the first audio and the second audio, or output a calibrated sound source to the speaker.

An operating method of an electronic device according to an embodiment of the present disclosure comprises transmitting a sound source to each of a speaker of the electronic device and an external device; obtaining a first audio corresponding to the sound source output through the speaker and a second audio corresponding to the sound source output through the external device; and controlling an EQ (Equalizer) mode of the external device based on a comparison result between the first audio and the second audio, or outputting a calibrated sound source to the speaker.

According to an embodiment of the present disclosure, if audio is output from a speaker embedded in an electronic device and an external device, heterogeneity can be minimized, and listening comfort can be improved.

According to an embodiment of the present disclosure, the sound quality effect can be maximized by automatically providing an acoustic setting that meets the intention of the user.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
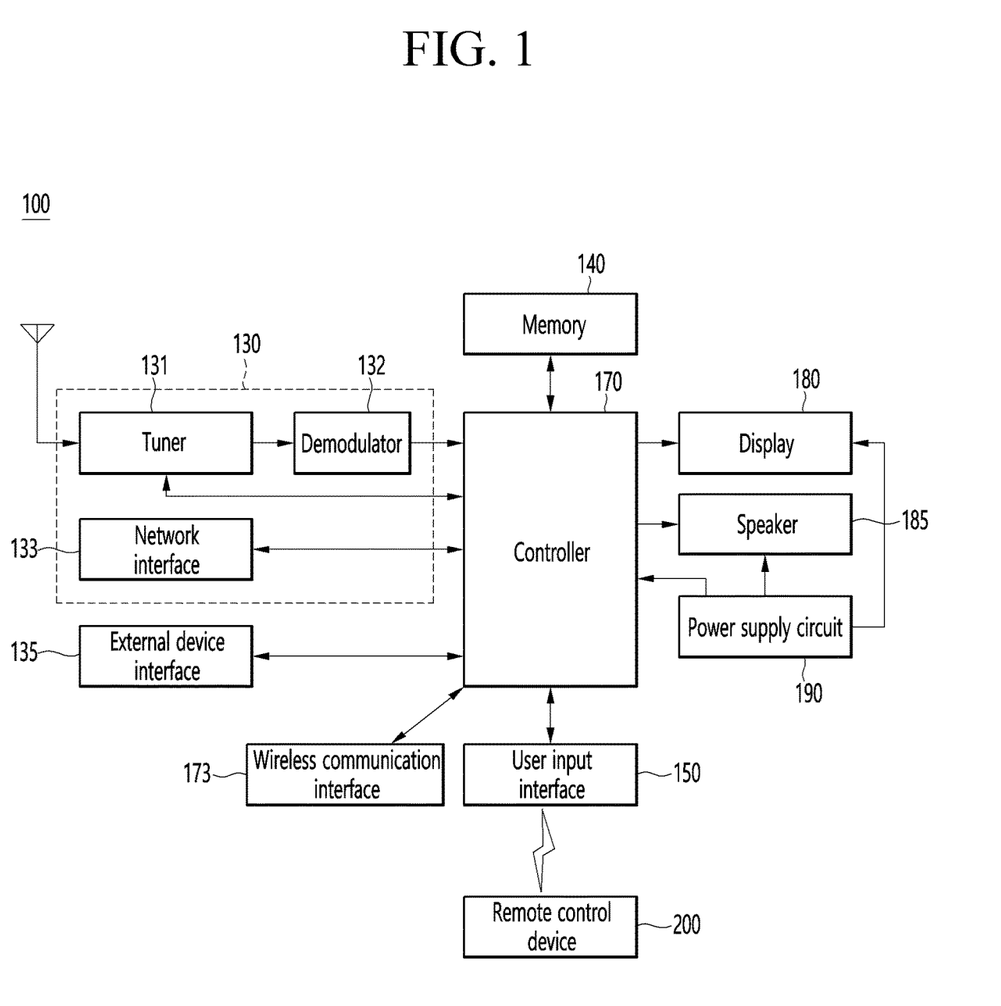
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a electronic device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the electronic device 100 and an external device. The external device interface 135 may receive one or more of images and audio output from an external device connected to the electronic device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the electronic device 100 to a wired/wireless network including an Internet network. The network interface 133 may transmit or receive data to or from other users or other electronic devices through a connected network or another network linked to the connected network.

In addition, a part of content data stored in the electronic device 100 may be transmitted to a selected user among a selected user or a selected electronic device among other users or other electronic devices registered in advance in the electronic device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The electronic device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the electronic device 100.

In addition, the controller 170 may control the electronic device 100 by a user command input through the user input interface 150 or an internal program and connect to a network to download an application a list of applications or applications desired by the user to the electronic device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the electronic device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the electronic device 100 and a wireless communication system, between the electronic device 100 and another electronic device 100, or between the electronic device 100 and a network in which the electronic device 100 (or an external server) is located through wireless area networks. The wireless area networks may be wireless personal area networks.

Here, the another electronic device 100 may be a wearable device (e.g., a smartwatch, smart glasses or a head mounted display (HMD), a mobile terminal such as a smart phone, which is able to exchange data (or interwork) with the electronic device 100 according to the present disclosure. The wireless communication interface 173 may detect (or recognize) a wearable device capable of communication around the electronic device 100.

Furthermore, when the detected wearable device is an authenticated device to communicate with the electronic device 100 according to the present disclosure, the controller 170 may transmit at least a portion of data processed by the electronic device 100 to the wearable device through the wireless communication interface 173. Therefore, a user of the wearable device may use data processed by the electronic device 100 through the wearable device.

The display 180 may convert image signals, data signals, and OSD signals processed by the controller 170, or image signals or data signals received from the external device interface 135 into R, G, and B signals, and generate drive signals.

Meanwhile, since the electronic device 100 shown in FIG. 1 is only an embodiment of the present disclosure, some of the illustrated components may be integrated, added, or omitted depending on the specification of the electronic device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the electronic device 100 shown in FIG. 1, the electronic device 100 may receive an image through the network interface 133 or the external device interface 135 without a tuner 131 and a demodulator 132 and play back the same.

For example, the electronic device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the electronic device 100 as described with reference to FIG. 1 and but also one of an image processing device such as the separated set-top box and a content playback device including the display 180 the speaker 185.

Figure 2:
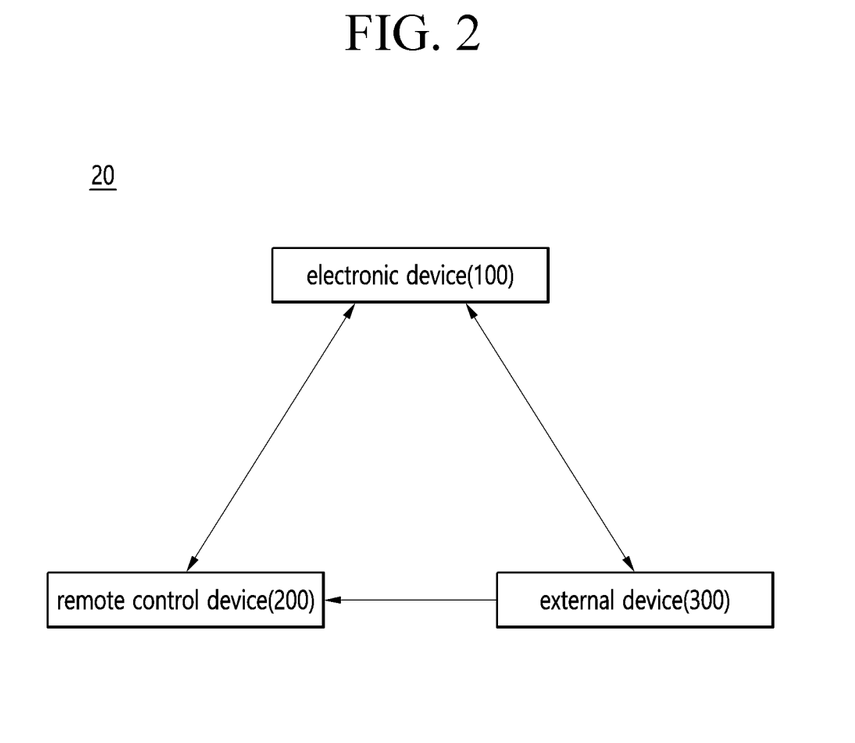
FIG. 2 is a drawing illustrating a configuration of an audio output system according to one embodiment of the present disclosure.

FIG. 2 is a drawing illustrating a configuration of an audio output system according to one embodiment of the present disclosure.

Referring to FIG. 2, an audio output system 20 may include an electronic device 100, a remote control device 200, and an external device 300.

The electronic device 100 may deliver a sound source to a built-in speaker 185, and may output a first audio corresponding to the sound source through the speaker 185.

The external device 300 may transmit the same sound source to the external device 300 as the sound source delivered to the speaker 185.

The remote control device 200 may be a remote control that remotely controls the electronic device 100.

The remote control device 200 may collect the first audio output through the speaker 185 and the second audio output through the external device 300 via the microphone.

The remote control device 200 may transmit the collected first audio and second audio to the electronic device 100.

The electronic device 100 may compare the received first audio and the second audio, and may control an EQ mode of the speaker 185 or an EQ mode of the external device 300 based on a result of the comparison.

The electronic device 100 may compare the received first audio and the second audio, and may correct the waveform of the audio delivered to the speaker 185 based on the result of the comparison.

Figure 3:
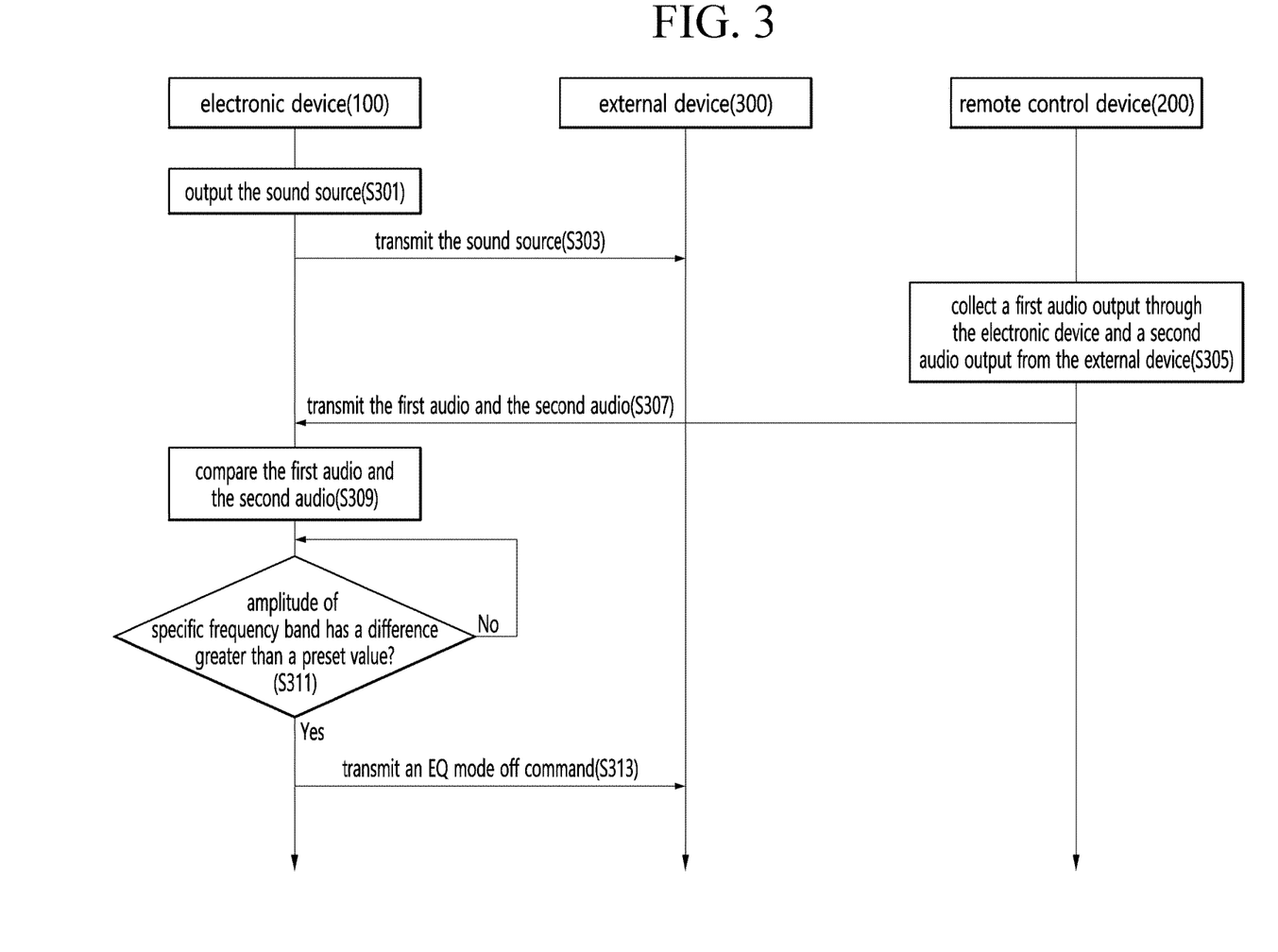
FIG. 3 is a ladder diagram illustrating a method of operation of an audio output system according to one embodiment of the present disclosure.

FIG. 3 is a ladder diagram illustrating a method of operation of an audio output system according to one embodiment of the present disclosure.

In FIG. 3, it is assumed that the electronic device 100 and the external device 300 are connected to each other via a wireless communication standard.

The wireless communication standard may be the Bluetooth standard, but this is only an example.

If the wireless communication standard is the Bluetooth standard, the wireless communication interfaces 173 of the electronic device 100 and the external device 300 may each be equipped with Bluetooth circuit for Bluetooth communication.

Referring to FIG. 3, the controller 170 of the electronic device 100 outputs the sound source through the speaker 185 (S301).

The speaker 185 may be a component built into the electronic device 100.

The controller 170 of the electronic device 100 transmits the sound source to the external device 300 via the wireless communication interface 173 or the external device interface 135 (S303).

In one embodiment, the controller 170 may transmit the same sound source to the external device 300 via the wireless communication interface 173 as the sound source delivered to the speaker 185.

The wireless communication interface 173 may include Bluetooth circuit.

Steps S301 and S303 may be reversed in order, or may be performed simultaneously.

In other embodiments, the external device 300 may be connected with the external device interface 135 of the electronic device 100. The controller 170 may transmit the same sound source to the external device 300 via the external device interface 135 as the sound source delivered to the speaker 185.

The remote control device 200 collects a first audio corresponding to the sound source output through the speaker 185 of the electronic device 100 and a second audio corresponding to the sound source output from the external device 300 (S305).

The remote control device 200 may be equipped with a microphone, and may collect the first audio and the second audio via the microphone.

The remote control device 200 may transmit the first audio and the second audio to the wireless communication interface 173 of the electronic device 100 via Bluetooth communication.

The controller 170 of the electronic device 100 may receive the first audio and the second audio from the remote control device 200 (S307).

The controller 170 may receive first audio and second audio through a Bluetooth circuit included in the wireless communication interface 173.

In FIG. 3, an embodiment in which the electronic device 100 receives first audio and second audio from the remote control device 200 is described, but it is not necessary to be limited thereto.

That is, the microphone provided in the electronic device 100 or an external microphone may collect first and second audio and transfer the collected audio to the controller 170.

Meanwhile, the controller 170 may identify audio output from the speaker 185 among the first audio and the second audio.

The controller 170 may compare the first audio and the sound source transmitted to the speaker 185 or the second audio and the sound source transmitted to the speaker 185 with each other.

As a result of the comparison, the controller 170 may determine audio having a higher similarity to the sound source among the first audio and the second audio as the audio output by the speaker 185.

The controller 170 may measure similarity through comparison of waveforms between the sound source and the first and second audios.

Meanwhile, the controller 170 may scale the first audio or the second audio in the process of identifying the audio output from the speaker 185 among the first audio and the second audio.

This is because a difference of a distance between the speaker 185 and the remote control device 200 and a distance between the external device 300 and the remote control device 200 may cause a difference in sound pressure.

The controller 170 of the electronic device 100 compares the received first audio and second audio (S309) and determines whether the amplitude of a specific frequency band has a difference greater than a preset value (S311).

The controller 170 may compare the waveform of the first audio and the waveform of the second audio, and according to the comparison result, determine whether the amplitude of a specific frequency band differs by more than a preset value.

The preset value may be 5 dB, but this is only an example.

Figure 4:
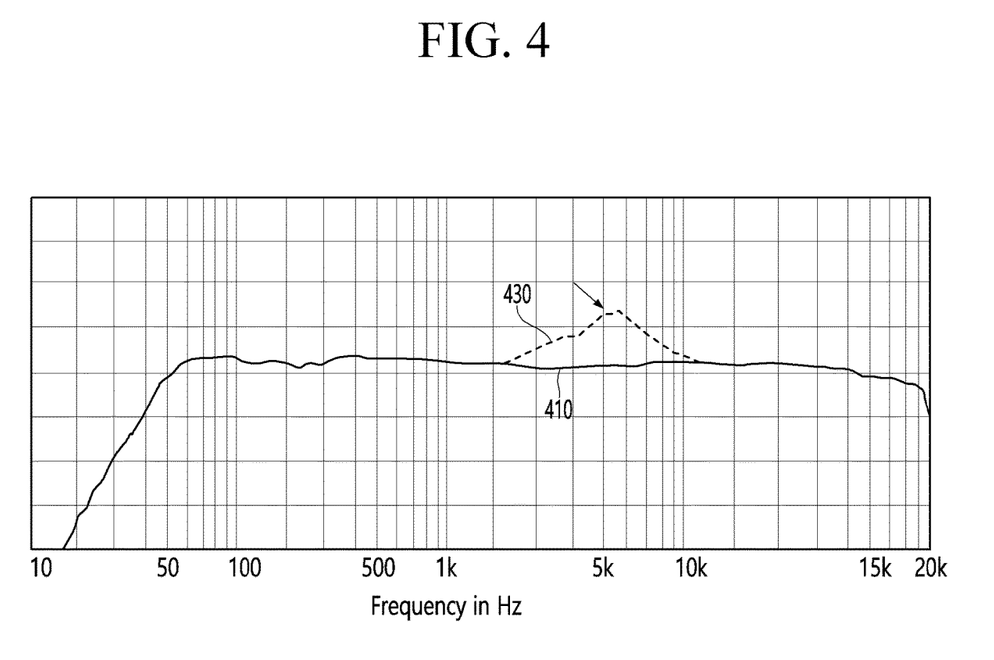
FIG. 4 is a diagram illustrating a first audio output by a speaker of an electronic device and a second audio output by an external device for the same sound source.

FIG. 4 is a diagram illustrating a first audio output by a speaker of an electronic device and a second audio output by an external device for the same sound source.

Referring to FIG. 4, a first audio 410 output from the speaker 185 of the electronic device 100 and a second audio 430 output from the external device 300 are illustrated.

Each of the first audio 410 and the second audio 430 may be a signal received from the remote control device 200.

The controller 170 of the electronic device 100 may determine whether the difference between the amplitude of the first audio 410 and the amplitude of the second audio 430 in a specific frequency band (1 kHz to 10 kHz) is equal to or greater than a predetermined value.

A preset value may be 5 dB, but this is only an example.

Assuming that the EQ mode is not applied to the speaker 185 of the electronic device 100 and the EQ mode is applied to the external device 300, as shown in FIG. 4, in a specific frequency band (1 kHz to 10 kHz) a difference between the amplitude of the first audio 410 and the amplitude of the second audio 430 may be equal to or greater than a preset value.

That is, in a specific frequency band (1 kHz to 10 kHz), the amplitude of the second audio 430 may be greater than a predetermined value compared to the amplitude of the first audio 410.

Again, FIG. 3 is described.

As a result of the comparison, the controller 170 of the electronic device 100 transmits an off command to turn off the EQ mode to the external device 300 if the amplitude of a specific frequency band differs by more than the predetermined value (S313).

In one embodiment, an equalizer (EQ) mode may be a mode for correcting frequency characteristic of an audio signal. The EQ mode may increase or decrease the amplitude of a specific frequency band of an audio signal.

The EQ mode may be any one of a standard mode, a music mode, a cinema mode, a sports mode, and a game mode.

If the waveform of the first audio and the waveform of the second audio are different in a specific frequency band, the controller 170 may transmit an EQ mode off command for turning off the EQ mode of the external device 300 through the wireless communication interface 173.

Specifically, the controller 170 may transmit the EQ mode off command for turning off the EQ mode of the external device 300 to the external device 300 through the wireless communication interface 173 if the amplitude of a specific frequency band differs by more than a preset value as a result of comparing the first audio and the second audio.

The external device 300 may turn off the set EQ mode according to the EQ mode off command received from the electronic device 100.

The external device 300 does not change the frequency characteristics of the sound source received from the electronic device 100 upon termination of the EQ mode.

Accordingly, a difference between the audio output from the external device 300 and the audio output from the speaker 185 of the electronic device 100 can be minimized, so that a user's sense of difference in sound quality can be minimized.

On the other hand, if the EQ mode of the speaker 185 is set and the amplitude of a specific frequency band has a difference of more than a preset value, the controller 170 may transmit an off command for turning off the EQ mode of the external device 300 to the external device 300.

Figure 5:
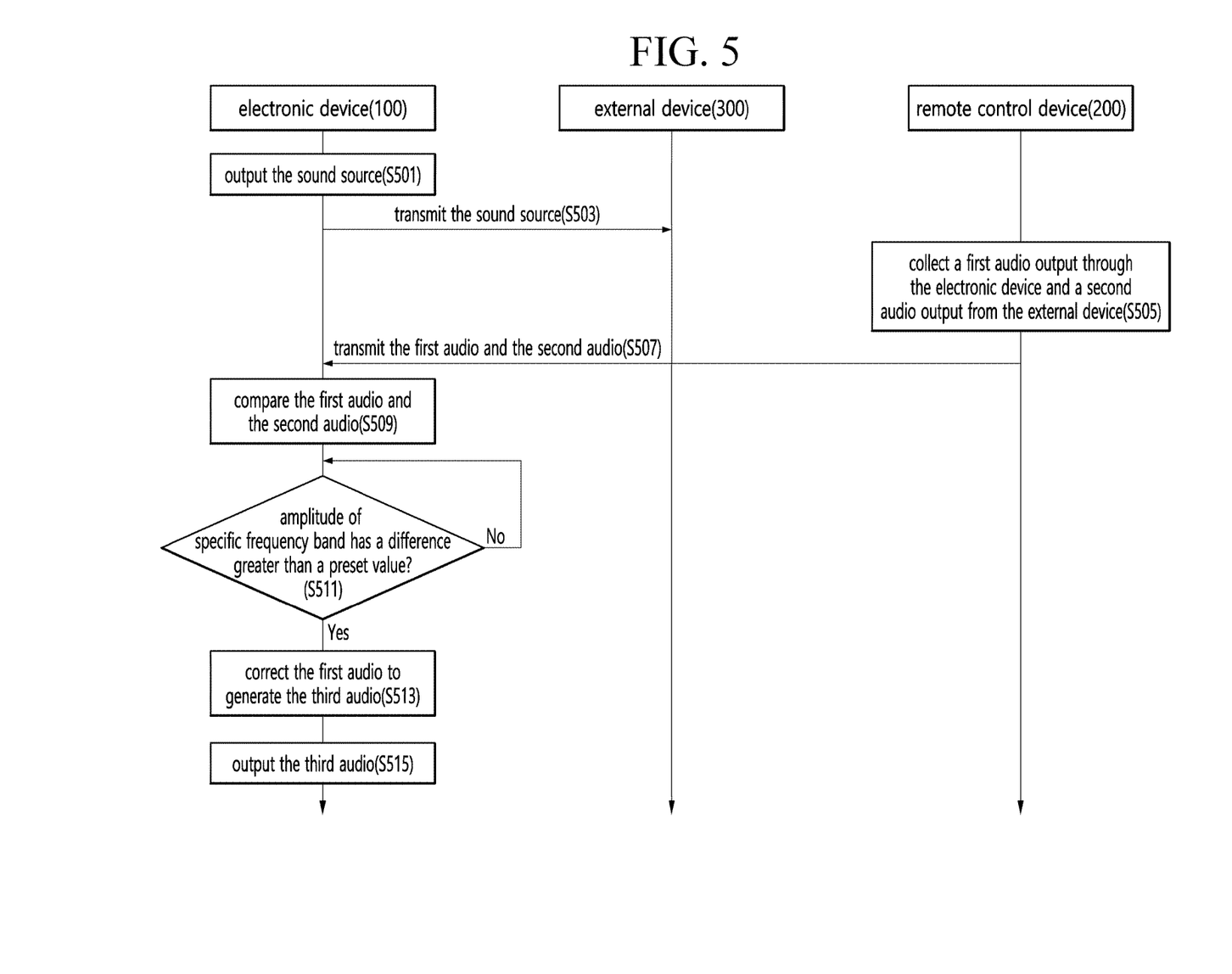
FIG. 5 is a ladder diagram illustrating a method of operation of an audio output system according to one embodiment of the present disclosure.

Next. FIG. 5 will be described.

FIG. 5 is a ladder diagram illustrating a method of operation of an audio output system according to one embodiment of the present disclosure.

In FIG. 5, it is assumed that the electronic device 100 and the external device 300 are connected to each other through a wireless communication standard.

The wireless communication standard may be the Bluetooth standard, but this is only an example.

If the wireless communication standard is the Bluetooth standard, each of the wireless communication interface 173 of the electronic device 100 and the external device 300 may include a Bluetooth circuit for Bluetooth communication.

Referring to FIG. 5, the controller 170 of the electronic device 100 outputs a sound source through a speaker 185 (S501).

The speaker 185 may be a component built into the electronic device 100.

The controller 170 of the electronic device 100 transmits a sound source to the external device 300 through the wireless communication interface 173 or the external device interface 135 (S503).

In one embodiment, the controller 170 may transmit the same sound source as that transmitted to the speaker 185 to the external device 300 through the wireless communication interface 173.

The wireless communication interface 173 may include a Bluetooth circuit.

In another embodiment, the external device 300 may be connected to the external device interface 135 of the electronic device 100. The controller 170 may transmit the same sound source as that transmitted to the speaker 185 to the external device 300 through the external device interface 135.

The remote control device 200 collects a first audio corresponding to the sound source output through the speaker 185 of the electronic device 100 and a second audio corresponding to the sound source output from the external device 300 (S505).

The remote control device 200 may have a microphone, and may collect the first audio and the second audio through the microphone.

The remote control device 200 may transmit the first audio and the second audio to the wireless communication interface 173 of the electronic device 100 through Bluetooth communication.

The controller 170 of the electronic device 100 receives the first audio and the second audio from the remote control device 200 (S507).

The controller 170 may receive the first audio and the second audio through a Bluetooth circuit included in the wireless communication interface 173.

In FIG. 5, an embodiment in which the electronic device 100 receives the first audio and the second audio from the remote control device 200 is described, but it is not necessary to be limited thereto.

That is, the microphone provided in the electronic device 100 or an external microphone may collect the first and second audios and transfer the collected audio to the controller 170.

The controller 170 of the electronic device 100 compares the received first audio and second audio (S509), and determines whether the amplitude of a specific frequency band has a difference greater than a predetermined value (S511).

The controller 170 may compare a waveform of the first audio and a waveform of the second audio, and according to a comparison result, determine whether the amplitude of a specific frequency band differs by more than the predetermined value.

The preset value may be 5 dB, but this is only an example.

If the controller 170 of the electronic device 100 determines that the amplitude of a specific frequency band differs by more than the predetermined value, the controller 170 corrects the first audio and generates the third audio (S513). In an embodiment, the controller 170 may correct the first audio to match the second audio.

If the waveform of the first audio and the waveform of the second audio are different in a specific frequency band, the controller 170 may correct the first audio so that the waveform of the first audio matches the waveform of the second audio.

Specifically, as shown in FIG. 4, if the amplitude of a specific frequency band between the first audio 410 and the second audio 430 is greater than or equal to the predetermined value, the controller 170 may correct an amplitude of the first audio 410 in the specific frequency band.

To this end, the controller 170 may increase the amplitude of a specific frequency band of the sound source transmitted to the speaker 185 and output the corrected sound source with the increased amplitude to the speaker 185.

Figure 6:
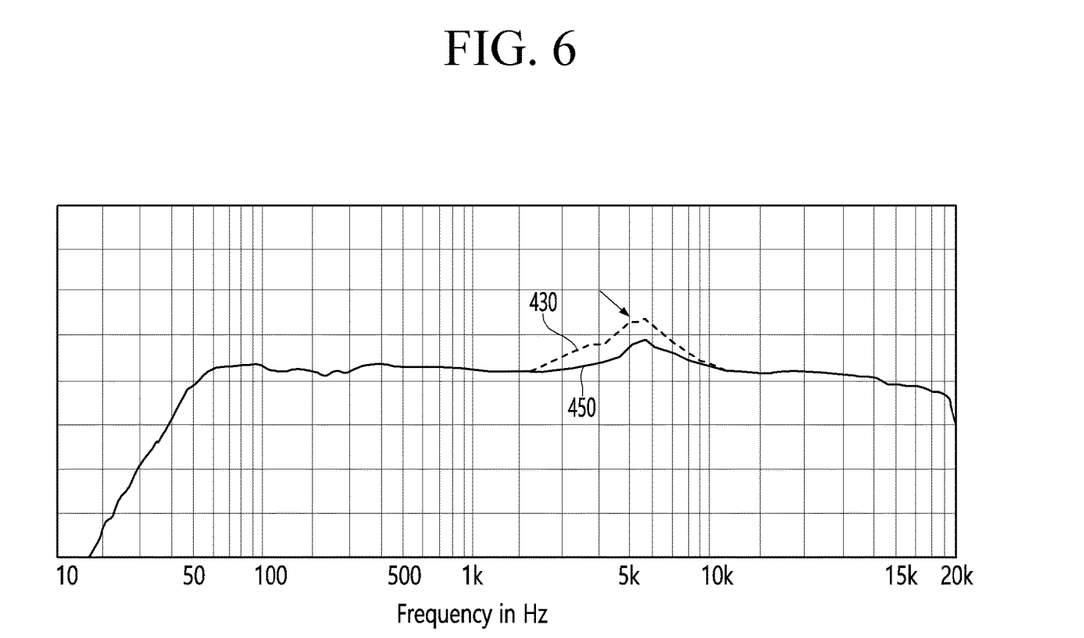
FIG. 6 is a diagram illustrating the result of calibrating the first audio of FIG. 4 according to an embodiment of the present disclosure.

FIG. 6 is a diagram illustrating the result of calibrating the first audio of FIG. 4 according to an embodiment of the present disclosure.

Referring to FIG. 5, the controller 170 may correct the first audio 410 of FIG. 4 with the third audio 450 if the difference in amplitude between the first audio 410 and the second audio 430 in a specific frequency band (1 kHz to 10 kHz) is equal to or greater than the predetermined value.

The controller 170 may increase the amplitude of the first audio similarly to the amplitude of the second audio 430 in the specific frequency band (1 kHz to 10 kHz).

A difference between the audio output from the external device 300 and the audio output from the speaker 185 of the electronic device 100 can be minimized, so that a user's sense of difference in sound quality can be minimized.

Meanwhile, the controller 170 may correct the first audio 410 to the third audio 450 if the EQ mode of the speaker 185 is not set and the EQ mode is set in the external device 300.

In another embodiment, if the EQ mode of the speaker 185 is not set and the EQ mode is set in the external device 300, the controller 170 can switch the EQ mode of the speaker 185 to match the EQ mode of the external device 300.

Again, FIG. 5 will be described.

The controller 170 of the electronic device 100 outputs the generated third audio through the speaker 185 (S515).

Accordingly, a difference between the audio output from the external device 300 and the audio output from the speaker 185 of the electronic device 100 can be minimized, so that a user's sense of difference in sound quality can be minimized.

Meanwhile, the controller 170 may transmit an EQ mode off command to the external device 300 if there are a plurality of frequency bands having amplitudes different from each other by more than a predetermined value as a result of comparing the first and second audios. This is to reduce the computational load for audio correction.

Figure 7:
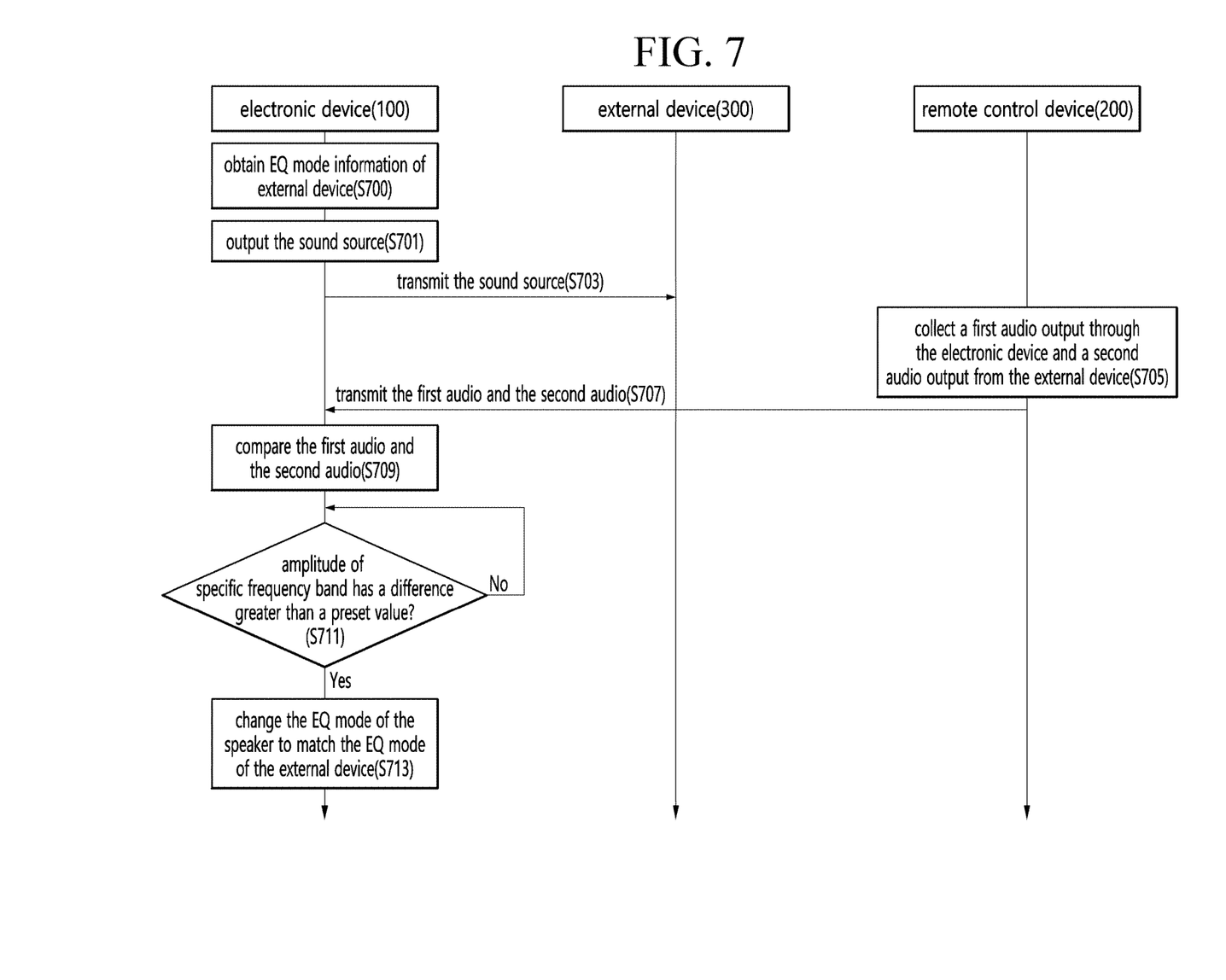
FIG. 7 is a ladder diagram illustrating a method of operation of an audio output system according to another embodiment of the present disclosure.

FIG. 7 is a ladder diagram illustrating a method of operation of an audio output system according to another embodiment of the present disclosure.

In FIG. 7, it is assumed that the electronic device 100 and the external device 300 are connected to each other through a wireless communication standard.

The wireless communication standard may be the Bluetooth standard, but this is only an example.

When the wireless communication standard is the Bluetooth standard, each of the wireless communication interface 173 of the electronic device 100 and the external device 300 may include a Bluetooth circuit for Bluetooth communication.

Referring to FIG. 7, the controller 170 of the electronic device 100 acquires EQ mode information of the external device 300 (S700).

The controller 170 may receive EQ mode information from the external device 300 after a Bluetooth connection establishment process or connection establishment with the external device 300.

The EQ mode information may include information about whether or not an EQ mode is set in the external device 300 and which EQ mode is set.

The controller 170 of the electronic device 100 outputs a sound source through the speaker 185 (S701).

The speaker 185 may be a component built into the electronic device 100.

The controller 170 of the electronic device 100 transmits a sound source to the external device 300 through the wireless communication interface 173 or the external device interface 135 (S703).

In one embodiment, the controller 170 may transmit the same sound source as that transmitted to the speaker 185 to the external device 300 through the wireless communication interface 173.

The wireless communication interface 173 may include a Bluetooth circuit.

In another embodiment, the external device 300 may be connected to the external device interface 135 of the electronic device 100. The controller 170 may transmit the same sound source as that transmitted to the speaker 185 to the external device 300 through the external device interface 135.

The remote control device 200 collects the first audio corresponding to the sound source output through the speaker 185 of the electronic device 100 and the second audio corresponding to the sound source output from the external device 300 (S705).

The remote control device 200 may have a microphone, and may collect the first audio and the second audio through the microphone.

The remote control device 200 may transmit the first audio and the second audio to the wireless communication interface 173 of the electronic device 100 through Bluetooth communication.

The controller 170 of the electronic device 100 receives the first audio and the second audio from the remote control device 200 (S707).

The controller 170 may receive the first audio and the second audio through a Bluetooth circuit included in the wireless communication interface 173.

In FIG. 7, an embodiment in which the electronic device 100 receives the first audio and the second audio from the remote control device 200 is described, but it is not necessary to be limited thereto.

That is, the microphone provided in the electronic device 100 or an external microphone may collect the first and second audios and transfer the collected audio to the controller 170.

The controller 170 of the electronic device 100 compares the received first audio and second audio (S709) and determines whether the amplitude of a specific frequency band has a difference greater than a preset value (S711).

The controller 170 may change the EQ mode of the speaker 185 to match the EQ mode of the external device 300 if the waveform of the first audio and the waveform of the second audio are different in a specific frequency band.

The controller 170 may compare the waveform of the first audio and the waveform of the second audio, and according to the comparison result, determine whether the amplitude of a specific frequency band differs by more than the preset value.

The preset value may be 5 dB, but this is only an example.

The controller 170 of the electronic device 100 change the EQ mode of the speaker 185 to match the EQ mode of the external device 100 if the amplitude of the specific frequency band between the received first and second audio is equal to or greater than the preset value (S713).

For example, if the EQ mode of the external device 300 is a cinema mode and the EQ mode of the speaker 185 is a sports mode, the controller 170 may switch the EQ mode of the speaker 185 from the sports mode to the cinema mode.

As another example, if the EQ mode of the external device 300 is a cinema mode and the EQ mode of the speaker 185 is off, the controller 170 may set the EQ mode of the speaker 185 to the cinema mode.

In this way, according to an embodiment of the present disclosure, the EQ mode of the speaker 185 of the electronic device 100 is controlled according to the EQ mode of the external device 300, so that a sense of difference in sound quality can be minimized.

Figure 8A:
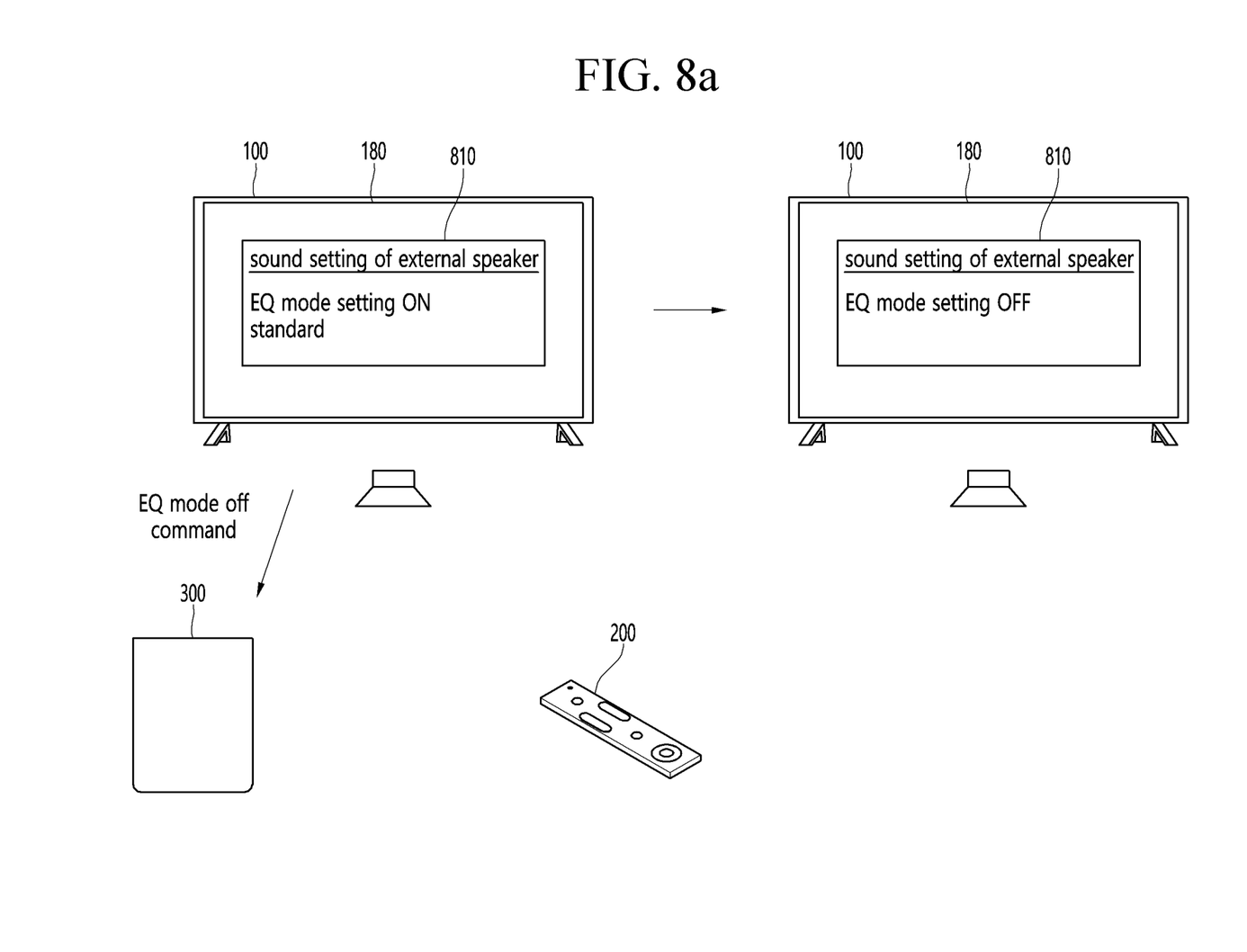
FIGS. 8A and 8B are drawings illustrating an example of automatically switching a setting of an EQ mode of an electronic device or an external device according to an embodiment of the present disclosure.
Figure 8B:
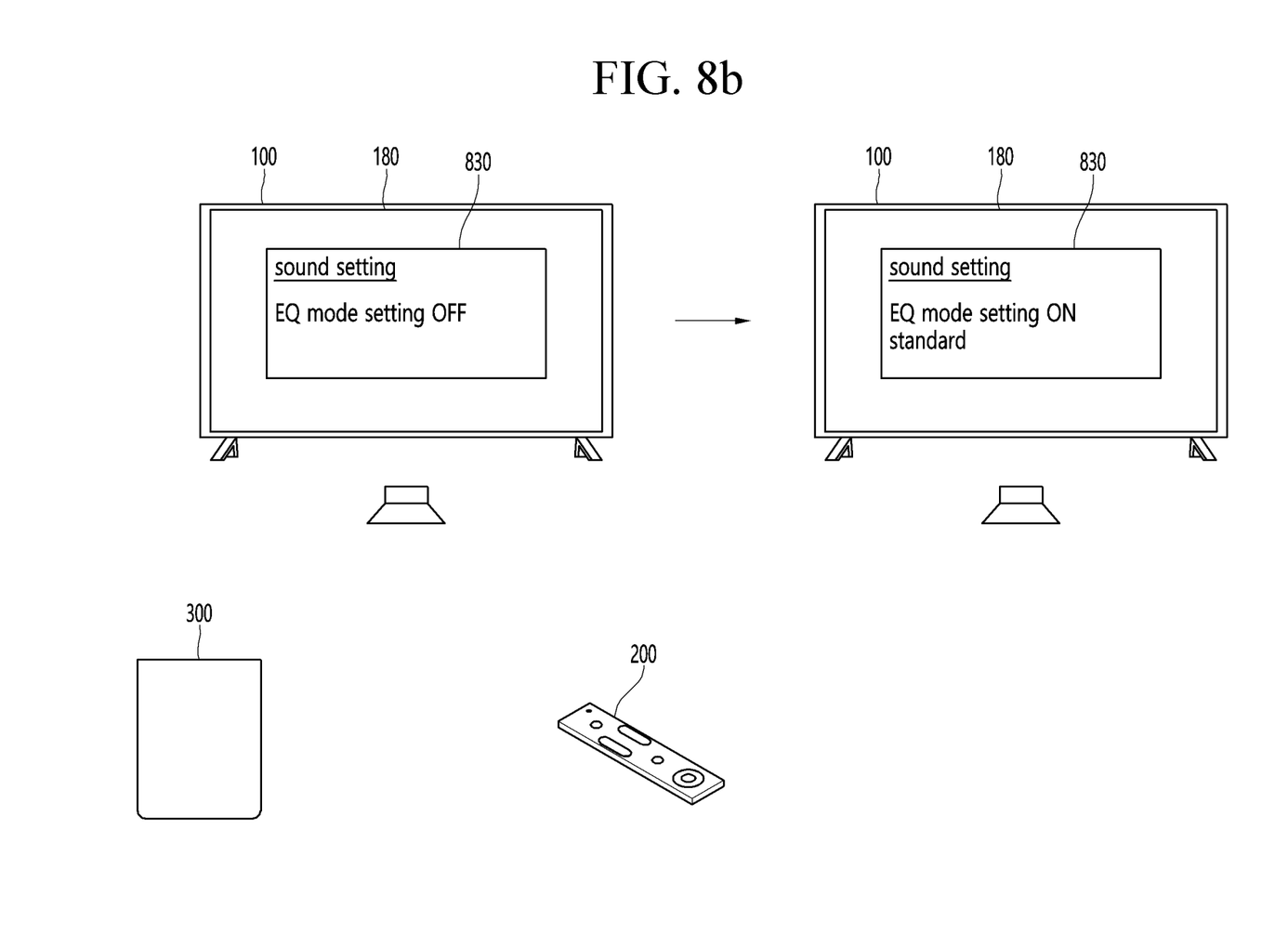

FIGS. 8A and 8B are drawings illustrating an example of automatically switching a setting of an EQ mode of an electronic device or an external device according to an embodiment of the present disclosure.

FIG. 8A assumes that the EQ mode of the speaker 185 of the electronic device 100 is turned off, the EQ mode of the external device 300 (or external speaker) is turned on, and is set to the standard mode.

The electronic device 100 may receive EQ mode information of the external device 300 from the external device 300 and display a sound setting menu 810 of the external device on the display 180 based on the received EQ mode information.

The sound setting menu 810 of the external device may include information on the currently set EQ mode (ON, standard mode) of the external device 300.

As a result of comparing the first audio and the second audio received from the remote control device 200, the electronic device 100 may transmit an EQ mode off command for turning off the EQ mode of the external device 300 to the external device 300 if there is a difference of more than a preset value in amplitude in a specific frequency band.

Accordingly, information displayed on the sound setting menu 810 of the external device may be changed from (ON, standard mode) to (OFF).

FIG. 8B assumes that the EQ mode of the speaker 185 of the electronic device 100 is turned on and the EQ mode of the external device 300 is set to the standard mode.

The electronic device 100 may display the sound setting menu 830 of the speaker 185 on the display 180.

The sound setting menu 830 of the speaker 185 may include information (OFF) about the currently set EQ mode of the speaker 185.

The electronic device 100 may switch the EQ mode of the speaker 185 if, as a result of comparing the first audio and the second audio received from the remote control device 200, the difference in amplitude is greater than or equal to the preset value in a specific frequency band.

That is, the electronic device 100 may change the EQ mode of the speaker 185 to the standard mode, which is the EQ mode of the external device 300.

Accordingly, information displayed on the sound setting menu 830 of the speaker 185 may be changed from (OFF) to (ON, standard mode).

In this way, the user can check change to the EQ mode of the electronic device 100 or the external device 300 through the sound setting menu.

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The electronic device described above is not limited to the configuration and method of the above-described embodiments, but the above embodiments may be configured by selectively combining all or part of each embodiment so that various modifications can be made.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a speaker;
a wireless communication interface configured to communicate with an external device wirelessly; and
a controller configured to:
transmit a sound source to the speaker,
transmit the sound source to the external device through the wireless communication interface,
obtain a first audio corresponding to the sound source output through the speaker and a second audio corresponding to the sound source output through the external device,
control an EQ (Equalizer) mode of the external device based on the first audio and the second audio, or output a calibrated sound source to the speaker,
transmit, to the external device, an off command to turn off the EQ mode based on a waveform of the first audio and a waveform of the second audio being different in a specific frequency band, and
transmit the off command to the external device based on an EQ mode of the speaker being off.

2. The electronic device of claim 1, wherein the controller is further configured to calibrate the sound source to match the waveform of the first audio to the waveform of the second audio based on the waveform of the first audio and the waveform of the second audio being different in the specific frequency band.

3. The electronic device of claim 1, wherein the controller is further configured to change the EQ mode of the speaker to match the EQ mode of the external device based on the waveform of the first audio and the waveform of the second audio being different in the specific frequency band.

4. The electronic device of claim 3, wherein the controller is further configured to receive, from the external device, information about the EQ mode currently set in the external device.

5. The electronic device of claim 1, wherein the controller is further configured to receive the first audio and the second audio from either a remote control device for remotely controlling the electronic device or an external microphone.

6. The electronic device of claim 1, further comprising a display, wherein the controller is further configured to display, on the display, a sound setting menu including information on the EQ mode of the speaker based on the first audio and the second audio.

7. The electronic device of claim 1, further comprising a display, wherein the controller is further configured to display, on the display, a sound setting menu including information on the EQ mode of the external device based on the first audio and the second audio.

8. The electronic device of claim 1, wherein the controller is further configured to transmit, to the external device, the off command for turning off the EQ mode of the external device based on the waveform of the first audio and the waveform of the second audio being different in a plurality of frequency bands.

9. The electronic device of claim 1, wherein the controller is further configured to determine, from among the first audio and the second audio, an audio having a higher similarity to the sound source as the audio output through the speaker.

10. The electronic device of claim 9, wherein the controller is further configured to scale either the first audio or the second audio.

11. The electronic device of claim 1, wherein the EQ mode of the external device is any one of a standard mode, a sport mode, a cinema mode, a music mode or a game mode.

12. The electronic device of claim 1, wherein the wireless communication interface includes Bluetooth circuitry configured to communicate through a Bluetooth standard.

13. The electronic device of claim 1, wherein the controller is further configured to control the EQ mode of the external device based on a result of comparing the first audio and the second audio.

14. A method of operating an electronic device, the method comprising:
transmitting a sound source to each of a speaker of the electronic device and an external device;
obtaining a first audio corresponding to the sound source output through the speaker and a second audio corresponding to the sound source output through the external device;
controlling an EQ (Equalizer) mode of the external device based on the first audio and the second audio, or outputting a calibrated sound source to the speaker;
transmitting, to the external device, an off command to turn off the EQ mode based on a waveform of the first audio and a waveform of the second audio being different in a specific frequency band; and transmitting the off command to the external device based on an EQ mode of the speaker being off.

15. The method of claim 14, wherein controlling the EQ mode of the external device or outputting the calibrated sound source comprises controlling the EQ mode of the external device based on a result of comparing the first audio and the second audio.

\* \* \* \* \*